(12) United States Patent
Tseitlin et al.

(10) Patent No.: US 9,580,846 B2
(45) Date of Patent: Feb. 28, 2017

(54) CURABLE SHEARED OR EXTRUDED, CROSS LINKED STARCH NANOPARTICLE LATEX BINDER FOR USE WITH MINERAL, NATURAL ORGANIC OR SYNTHETIC FIBRE PRODUCTS AND NON-WOVEN MATS

(75) Inventors: Alexander Tseitlin, Halton Hills (CA); David Van Alstyne, Burlington (CA); Steven Bloembergen, Okemos, MI (US)

(73) Assignee: EcoSynthetix Ltd., Lansing, MI (US)

( * ) Notice: Subject to any disclaimer, the term of this patent is extended or adjusted under 35 U.S.C. 154(b) by 248 days.

(21) Appl. No.: 14/123,150

(22) PCT Filed: Jun. 4, 2012

(86) PCT No.: PCT/CA2012/050375
§ 371 (c)(1),
(2), (4) Date: Apr. 2, 2014

(87) PCT Pub. No.: WO2012/162845
PCT Pub. Date: Dec. 6, 2012

(65) Prior Publication Data
US 2014/0295090 A1 Oct. 2, 2014

Related U.S. Application Data

(60) Provisional application No. 61/493,266, filed on Jun. 3, 2011.

(51) Int. Cl.
*C09J 103/04* (2006.01)
*D04H 1/587* (2012.01)
(Continued)

(52) U.S. Cl.
CPC ........... *D04H 1/587* (2013.01); *B29C 39/003* (2013.01); *C03B 37/04* (2013.01); *C08J 5/24* (2013.01);
(Continued)

(58) Field of Classification Search
None
See application file for complete search history.

(56) References Cited

U.S. PATENT DOCUMENTS 3,869,296 A 3/1975 Kelly et al.
4,014,426 A 3/1977 Neufeld
(Continued)

FOREIGN PATENT DOCUMENTS

CN 102019697 4/2011
EP 354023 * 2/1990
(Continued)

OTHER PUBLICATIONS

Rojas et al, International Journal of Pharmaceutical Sciences Review and Research vol. 8, issue 1, May-Jun. 2011, pp. 28-36.*
(Continued)

*Primary Examiner* — Erma Cameron

(57) ABSTRACT

A curable aqueous binder composition comprising sheared or extruded cross linked starch particles and a crosslinking agent for use in the formation of composite materials such as mineral, natural organic or synthetic fiber products including mineral fiber insulation, non-woven mats, fiberglass insulation and related glass fiber products as well as wood based products and construction materials. In one application the curable aqueous starch binder composition may be blended with a second non-formaldehyde resin to make fiberglass insulation. In another application the curable aqueous starch binder composition may be mixed into a formaldehyde based resin to make fiberglass roof shingles.

11 Claims, 6 Drawing Sheets

(51) Int. Cl.
  *C08L 97/02* (2006.01)
  *C08J 5/24* (2006.01)
  *C09J 161/24* (2006.01)
  *C08L 61/24* (2006.01)
  *B29C 39/00* (2006.01)
  *C03B 37/04* (2006.01)

(52) U.S. Cl.
  CPC ............... *C08L 61/24* (2013.01); *C08L 97/02* (2013.01); *C09J 103/04* (2013.01); *C09J 161/24* (2013.01); *C08J 2303/02* (2013.01); *C08J 2303/04* (2013.01); *C08L 2205/16* (2013.01); *C08L 2205/18* (2013.01); *Y10T 442/2992* (2015.04)

(56) References Cited

U.S. PATENT DOCUMENTS

| | | |
|---|---|---|
| 4,014,726 A | 3/1977 | Fargo |
| 4,126,512 A | 11/1978 | Hill |
| 4,135,029 A | 1/1979 | Pfeffer et al. |
| 4,258,098 A | 3/1981 | Bondoc et al. |
| 4,308,165 A | 12/1981 | Vassiliades et al. |
| 4,324,833 A | 4/1982 | Yau |
| 4,366,096 A | 12/1982 | Abrams |
| 4,430,158 A | 2/1984 | Jackey et al. |
| 4,455,416 A | 6/1984 | Floyd et al. |
| 4,542,068 A | 9/1985 | Whichard et al. |
| 4,968,746 A | 11/1990 | Derudder et al. |
| 5,026,746 A | 6/1991 | Floyd et al. |
| 5,389,716 A | 2/1995 | Graves |
| 5,674,937 A | 10/1997 | Berg |
| 5,736,209 A | 4/1998 | Andersen et al. |
| 5,914,365 A | 6/1999 | Chang et al. |
| 5,977,232 A | 11/1999 | Arkens et al. |
| 6,068,882 A | 5/2000 | Ryu et al. |
| 6,084,021 A | 7/2000 | Chang et al. |
| 6,221,973 B1 | 4/2001 | Arkens et al. |
| 6,331,350 B1 | 12/2001 | Taylor et al. |
| 6,642,299 B2 | 11/2003 | Wertz et al. |
| 6,667,386 B1 | 12/2003 | Queisser et al. |
| 6,677,386 B1* | 1/2004 | Giezen .................... C08B 30/12 106/206.1 |
| 6,677,836 B2 | 1/2004 | Uchiyama et al. |
| 6,755,915 B1 | 6/2004 | Van Soest et al. |
| 6,818,686 B1 | 11/2004 | Colpaert et al. |
| 6,825,252 B2 | 11/2004 | Helbling et al. |
| 6,884,849 B2 | 4/2005 | Chen et al. |
| 6,921,430 B2 | 7/2005 | Bloembergen et al. |
| 7,160,420 B2 | 1/2007 | Helbling et al. |
| 7,238,402 B2 | 7/2007 | Swales et al. |
| 7,268,091 B2 | 9/2007 | Xing et al. |
| 7,272,915 B2 | 9/2007 | Peng |
| 7,832,983 B2 | 11/2010 | Kruckenberg et al. |
| 7,854,980 B2 | 12/2010 | Jackson et al. |
| 8,133,952 B2 | 3/2012 | Pisanova et al. |
| 8,137,731 B2 | 3/2012 | Pater et al. |
| 2003/0008586 A1 | 1/2003 | Kajander et al. |
| 2004/0011487 A1* | 1/2004 | Helbling ............... C08B 31/006 162/158 |
| 2004/0014844 A1* | 1/2004 | Helbling ................ D21H 19/54 524/47 |
| 2004/0038017 A1 | 2/2004 | Tutin et al. |
| 2004/0082241 A1 | 4/2004 | Rodrigues |
| 2004/0231559 A1* | 11/2004 | Bloembergen ......... C09J 103/02 106/206.1 |
| 2004/0241381 A1 | 12/2004 | Chen |
| 2004/0241382 A1 | 12/2004 | Bloembergen et al. |
| 2005/0061203 A1 | 3/2005 | Helbling et al. |
| 2005/0202258 A1 | 9/2005 | Swales et al. |
| 2005/0214534 A1 | 9/2005 | Adamo et al. |
| 2006/0251819 A1 | 11/2006 | Zama et al. |
| 2006/0252855 A1 | 11/2006 | Pisanova et al. |
| 2007/0014236 A1 | 1/2007 | Jang et al. |
| 2007/0142596 A1 | 6/2007 | Swift et al. |
| 2007/0284120 A1 | 12/2007 | Rowen |
| 2008/0051539 A1 | 2/2008 | Kelly |
| 2008/0160289 A1 | 7/2008 | Lin |
| 2008/0248303 A1 | 10/2008 | Maurer |
| 2009/0042003 A1 | 2/2009 | Govang et al. |
| 2010/0080976 A1 | 4/2010 | Jackson et al. |
| 2010/0143738 A1* | 6/2010 | Bloembergen .......... B29C 47/40 428/537.5 |
| 2010/0330376 A1* | 12/2010 | Trksak .................... C08B 11/08 428/426 |
| 2011/0003522 A1 | 1/2011 | Chen et al. |
| 2011/0021101 A1 | 1/2011 | Hawkins et al. |
| 2011/0042841 A1 | 2/2011 | Wildi et al. |
| 2011/0086567 A1 | 4/2011 | Hawkins et al. |
| 2011/0086949 A1 | 4/2011 | Mentink et al. |
| 2011/0196071 A1 | 8/2011 | Mentink et al. |
| 2011/0300394 A1 | 12/2011 | Welsch et al. |
| 2012/0141551 A1 | 6/2012 | Bloembergen et al. |
| 2012/0309246 A1* | 12/2012 | Tseitlin .................... C08J 5/24 442/180 |

FOREIGN PATENT DOCUMENTS

| | | |
|---|---|---|
| EP | 0700673 | 3/1996 |
| EP | 1114003 | 6/2002 |
| GB | 1420392 | 1/1976 |
| GB | 2451719 | 2/2009 |
| JP | 4202302 | 7/1992 |
| JP | 11256477 | 9/1999 |
| JP | 2002-544335 A | 12/2002 |
| JP | 2004-532146 A | 10/2004 |
| JP | 2005-505639 A | 2/2005 |
| RU | 2142878 C1 | 12/1999 |
| WO | 9412328 A1 | 6/1994 |
| WO | 0040617 | 7/2000 |
| WO | 0069916 | 11/2000 |
| WO | 02087868 | 11/2002 |
| WO | 02088271 | 11/2002 |
| WO | 03106561 | 12/2003 |
| WO | 2004003025 | 1/2004 |
| WO | 2006120523 | 11/2006 |
| WO | 2008022127 | 2/2008 |
| WO | 2010065750 | 6/2010 |
| WO | 2010084060 | 7/2010 |
| WO | 2010084088 | 7/2010 |
| WO | 2010114698 | 10/2010 |
| WO | 2010132641 | 11/2010 |
| WO | 2011071742 | 6/2011 |
| WO | 2011109331 | 9/2011 |
| WO | 2011155979 | 12/2011 |
| WO | 2012162845 | 12/2012 |

OTHER PUBLICATIONS

Bloembergen et al, Paper360, 3(9), pp. 46-48, 2008.*
Tseitlin, A., "Biolatex binders: Next generation breakthrough using nano-starch dispersions" EcoSynthetix—Sustainable Polymers for Plant Earth, INDA's Rise 2011 Conference, Oct. 5, 2011.
Lee, D.I., et al., "Development of new biobased emulsion binders", Presented at PaperCon 2010, Talent, Technology and Transformation, Altanta, GA, May 2-5, 2010, pp. 1-19.
Bloembergen, S., et al., Biolatex Binders for Paper and Paperboard Applications, Journal of Pulp and Paper Science, 2010, pp. 1-11, vol. 36, No. 3-4.
http://insulation.owenscoming.ca/ecotouch/. Downloaded on May 25, 2012.
Song, D., "Starch crosslinking for cellulose fibre modification and starch nanoparticle formation", Georgia Institute of Technology, http://hdl.handle.net/1853/39524, May 2011.
Bloembergen et al. "Specialty Biobased Monomers and Emulsion Polymers Derived from Starch", Tappi 11th Advanced Coating Fundamentals Symposium, Munich, Germany, Oct. 11-13, 2010).
Song, D. et al, "Starch nanoparticle formation via reactive extrusion and related mechanism study", Carbohydrate Polymers, Feb. 2011, pp. 208-214, vol. 85, No. 15.

(56) References Cited

OTHER PUBLICATIONS

IARC 2004. IARC Classifies Formaldehyde as Carcinogenic to Humans. IARC Press Release No. 153. International Agency for Research on Cancer, available at www.iarc.fr/en/media-centre/pr/2004/pr153.html Jun. 2004.
Formaldehyde Gas. Report on Carcinogens, 12th Edition. National Toxicology Program, 2011, available at ntp.niehs.nih.gov/ntp/roc/twelfth/profiles/Formaldehyde.pdf.
Greenal et al."New generation of biobased latex coating binders for a sustainable future", Paper Technology 52, No. 1, Paper Industry Ass'n, p. 10-14, Feb. 2011.
Klass, C. "New Nanoparticle Latex offers Natural Advantage", Paper360 Magazine, p. 30-31, Jan. 2007.
Figliolino et al. "Reducing Carbon Footprint with Biolatex", Paper360 Magazine, p. 25-28, Aug. 2009.
Oberndorfer et al. "Coating & print performance of biobased latex in European graphic papers", PaperCon2011, Rethink Paper Lean and Green, Cincinnati, OH, May 1-5, 2011.
Non-Final Office Action in related U.S. Appl. No. 13/486,555, mailed Apr. 10, 2013.
Non-Final Office Action in related U.S. Appl. No. 13/486,555, mailed Jan. 15, 2014.
Final Office Action in related U.S. Appl. No. 13/486,555, mailed Oct. 20, 2014.
Examiner's Answer to Appeal Brief for related U.S. Appl. No. 13/486,555, mailed Nov. 23, 2015.
Heidelberger Bauchemie GMBH, English language abstract of EP1114003, published Jun. 19, 2002.
Univ Inner Mongolia, English language abstract of CN102019697, published Apr. 20, 2011.
Nippon Starch Chem Co Ltd., English language abstract of JP11256477, published Sep. 21, 1999.
Ueno Keisuke, English language abstract of JP4202302, published Jul. 23, 1992.
International Search Report and Written Opinion issued in relation to PCT/US2013/053209, mailed Jan. 10, 2014.
International Search Report and Written Opinion issued in relation to PCT/US2013/073341, mailed Aug. 22, 2014.
Office Action mailed May 31, 2016 on related Japanese Application No. 2014-513019.
Office Action issued May 25, 2016 on related Russian Application No. 2013152008.

\* cited by examiner

CURABLE SHEARED OR EXTRUDED, CROSS LINKED STARCH NANOPARTICLE LATEX BINDER FOR USE WITH MINERAL, NATURAL ORGANIC OR SYNTHETIC FIBRE PRODUCTS AND NON-WOVEN MATS

CROSS REFERENCES TO RELATED APPLICATIONS

This application is a national phase entry of PCT/CA2012/050375, filed on Jun. 4, 2012, which claims the benefit under 35 USC 119 of U.S. Provisional Patent Application No. 61/493,266 filed on Jun. 3, 2011. U.S. Provisional Patent Application No. 61/493,266 is incorporated by reference.

STATEMENT REGARDING FEDERALLY SPONSORED RESEARCH

Not Applicable.

BACKGROUND OF THE INVENTION

1. Field of the Invention

This invention relates to a curable composition, for example a composition useful for forming a composite material comprising biopolymer particles, and to composite materials, for example mineral fiber insulation and roofing shingles.

2. Description of the Related Art

The following discussion is not an admission that anything described below is common knowledge of persons skilled in the art, or citable as prior art.

Mineral fibers used in insulation products and non-woven mats are usually bonded together with a crosslinked binder resin. The binder has to provide the resilience for recovery after packaging (in the case of insulation products) as well as stiffness and compatibility between individual fibers.

The process for making mineral fiber products such as fiberglass insulation typically includes melting minerals, sand or recycled glass, producing a molten glass stream that is passed through high pressure air fiberizers or "spinning wheels" where the glass is then spun into thin fibers and transported onto a belt to form the fiberglass insulation product. Given the enormous volume and surface area expansion, the temperature drops almost instantaneously from the red hot mineral stream to the relatively cool mineral fibers. This rapid drop in temperature facilitates the application of an aqueous polymeric binder composition immediately following the fiberizer without substantially degrading the polymer and other binder components, and more importantly, without triggering premature curing and crosslinking such that the subsequent sections of the manufacturing process can be used to control the dimensions of the fiberglass mat product. The fibers are then blown to a conveyor through a forming chamber where they are dried and cured. As part of this process, the coated mat is generally transferred to a forming or air-fluffing chamber and subsequently a curing oven to cure the binder and bond the glass fibers together. Prior to the curing process, the degree of fluffing facilitates the control over the dimensions of the particular grade of mineral fiber product.

The dominant binders for insulation and non-woven mats as well as for wood products are formaldehyde based resins, such as phenol-formaldehyde (PF), melamine-formaldehyde (MF), and urea-formaldehyde (UF) resins and the like, as well as mixed phenol/urea-formaldehyde (P/UF) resins and the like. A serious disadvantage of formaldehyde-based resins is the release of free formaldehyde to the environment during manufacturing and use, contaminating the air that we breathe which is undesirable for health and ecological reasons. Note that formaldehyde has been reported to be a human carcinogen (IARC 2004. IARC Classified Formaldehyde as Carcinogenic to Humans. IARC Press Release No. 153. International Agency for Research on Cancer, available at www.iarc.fr/en/media-centre/pr/2004/pr153.html. Substances Profile: Formaldehyde Gas. Report on Carcinogens, 11th Edition. National Toxicology Program, available at http://ntp.niehs.nih.gov/ntp/roc/eleventh/profiles/s089form.pdf; and National Emissions Standard for Formaldehyde in Composite Wood Products Becomes Law, found at http://www.aqs.com/DesktopDefault.aspx?mid=168&tabid=82&ItemId=30). In addition to the health and environmental problems, further compounding the problem is that the lowest cost formaldehyde based binders are based on UF resins. Therefore, UF has traditionally been the dominant binder system used in mineral fiber products, fiberglass insulation, nonwovens as well as wood products, such as particle board, plywood and oriented strand board (OSB) products. Of all the formaldehyde based resins, UF is the least stable to hydrolysis especially at elevated temperature (30-45° C., or higher) and humidity, it has commonly been the preferred binder for indoor uses (such as particle board used in kitchen cabinets, countertops, furniture, etc.), where air contamination and human exposure risks are highest. This problem recently gained visibility in the US when hurricanes Katrina and Rita devastated the Louisiana, Mississippi and Alabama coastlines. The problem was brought to the forefront following serious health and air quality complaints by displaced hurricane victims and concerns arose over high levels of formaldehyde found in some travel trailers and temporary housing (FEMA trailers). Survivors housed in the trailers were exposed to high levels of formaldehyde due to the hot and humid conditions of the local climate (Four Years Later: Formaldehyde Exposure & Emissions Standards, Product Evaluations Technology Brief by Air Quality Sciences, Inc., Volume 9, Issue 9). The somewhat more costly pure PF and MF resins are generally more stable to hydrolysis. These resins are typically used in outdoor applications, and therefore their main challenge is worker exposure during manufacturing, while in-use release of formaldehyde is less of a concern, especially in outdoor applications. Note, however, that PF resin products shipped by the resin supplier may contain a significant level of free formaldehyde, which then needs to be reduced by the downstream (e.g. fiberglass) manufacturer in a pre-reaction. This is commonly done using urea to capture most of the free formaldehyde to result in mixed P/UF binder systems. Thus, the so-called PF binders used in these applications actually are P/UF systems which are prone to more free formaldehyde release in use given the UF portion is less stable to hydrolysis, especially at temperatures between 30-45° C., or higher.

In addition, formaldehyde based binders are petroleum-based synthetic products. In an era of depleting oil reserves and increasing costs of petrochemicals, the need to wean our industries away from their dependence on foreign oil has become paramount. Plant, animal and agro-based materials are in balance with nature and are "carbon neutral", whereas petro-based materials are not because they are "carbon positive" (see Phil Greenall and Steven Bloembergen, "New generation of biobased latex coating binders for a sustainable future", Paper Technology 52, No. 1, Paper Industry Technical Ass'n, p. 10-14, February 2011; and Do lk Lee, Steven Bloembergen, and John van Leeuwen, "Development of New Biobased Emulsion Binders", TAPPI, PaperCon2010 Meeting, "Talent, Technology and Transformation", Atlanta, Ga., May 2-5, 2010). Biobased materials offer a much reduced carbon footprint, and green agro-based products are becoming more and more important in an age where greenhouse gas (GHG) emissions are escalating.

However, traditional biobased industrial materials derived from agricultural crops are generally viewed by manufacturing and packaging industries as less consistent and inferior to the dominant petrochemical-based synthetic products.

Various attempts have been made to reduce undesirable formaldehyde emissions as well as developing formaldehyde-free binders and use other synthetic oil-derived polymer resins, as well as traditional modified soluble starches, dextrins or other low performance biobased materials. However, these have serious shortcomings such as high cost, high corrosivity, high viscosity, dark color, lack of rigidity, water sensitivity, poor bond strength, etc.

A number of formaldehyde-free compositions have been developed for use as a binder for making nonwoven products.

U.S. Pat. No. 5,977,232 discloses a formaldehyde-free binder for glass wool insulation based on carboxylic acid which is corrosive due to the low pH of the system. This technology has been found to result in major corrosion problems with the equipment used to manufacture fiberglass insulation products, as well as in-use applications where metal wall studs and other metal components are being used in combination with the fiber glass insulation product.

U.S. Patent Application Publication No. 2003/0008586 discloses the use of polyvinyl alcohol (PVOH) as a formaldehyde-free binder solution for low binder nonwoven fiber mat useful for making wood product laminates. The binder produces high bonding strength with wood and is characterized by a relatively good storage stability (relative to formaldehyde resins). The binder is used at 5% concentration. The problem is the much higher cost of PVOH relative to conventional formaldehyde binder systems. In addition, since it is petroleum based it is a carbon positive material which is not environmentally preferred. Without any additional enhancer, this binder does not provide sufficient wet strength and water resistance.

U.S. Pat. Nos. 6,221,973 and 6,331,350 describe a formaldehyde-free fiberglass binder including a polyacid, such as polyacrylic acid, and a polyol, with a molecular weight less than about 1000, such as, for example, glycerol, triethanolamine, sorbitol, or ethylene glycol. A phosphorous catalyst is used to accelerate the cure of the composition. The major disadvantage of this binder is high cost and low pH which causes corrosion of fiber glass mat production equipment and during in-use applications.

PCT Patent Application Publication No. WO 2006/120523 describes a polyvinyl alcohol-based formaldehyde-free curable aqueous composition comprising PVOH crosslinked with multifunctional crosslinking agent (e.g. nonpolymeric polyacid, polyaldehyde or anhydride). Disadvantages of this system are low pH and high viscosity at relatively low solids content. The problems as mentioned above include the much higher cost of PVOH relative to conventional formaldehyde binder systems, and since it is petroleum based it is a carbon positive material which is not environmentally preferred. This binder is also corrosive due to relatively low pH (about 4) and does not provide the required water resistance.

U.S. Pat. No. 6,884,849 describes a polyalcohol-based binder composition comprising a low molecular weight polycarboxylic acid and a low molecular weight polyalcohol, such as PVOH having an average molecular weight between 200 and 13,000. The binder solution preferably comprises at least one cure catalyst or accelerator, such as sodium hypophosphite. The binder exhibits a high cure rate and provides a good recovery of the final nonwoven product. However, a practical use of such a composition for insulation production is limited because the high acidity of these binder compositions will cause corrosion of production lines and during the in-use applications. Moreover, whilst the strength of this binder is acceptable for some applications it is not as good as the commonly used formaldehyde based binders. In addition, since it is petroleum based it is a carbon positive material which is not environmentally preferred.

U.S. Patent Application Publication No. 2004/0038017 describes a binder composition containing a substantially water-dilutable or dispersible adduct of a monomeric polycarboxylic acid component and a monomeric polyol component to yield a polyester. This binder requires a much longer time (up to 15 minutes) for curing under standard curing conditions, or a much higher temperature (of about 300° C.), which a serious disadvantage.

U.S. Patent Application Publication No. 2010/0080976 discloses formaldehyde-free mineral fiber insulation product based on a combination of polycarboxylic acid, sugar and ammonia. Such a system has relatively low water resistance, is dark in color and generates ammonia emissions upon cure. In addition, since it is petroleum based it is a carbon positive material which is not environmentally preferred.

Formaldehyde free binders disclosed in U.S. Patent Application Publication No. 2007/0142596 and GB 2451719A relate to binders comprising Maillard reactants, in particular dextrose systems derived from a mixture of dextrose monohydrate, anhydrous citric acid, water and aqueous ammonia. These binders turn dark brown on curing and have poor water and biological resistance.

While these references and other prior art systems disclose various formaldehyde-free systems for insulation and non-woven mats, they all have limitations with respect to developing binders that are effective as well as environmentally friendly.

High strength fiber mats are extremely popular in the building materials industry. Most non-woven fiber mats have numerous applications, including use in roofing, siding and floor underlayment, insulation facers, floor and ceiling tiling, and vehicle parts. The most common use of fiber mats is in roofing shingles, and in particular in asphalt roofing shingles.

Various fiber mats and methods of making the same have been previously described. For example, U.S. Pat. Nos. 4,135,029, 4,258,098, 5,914,365, and 6,642,299 describe glass fiber mats made by a wet-laid process. Glass fiber mats made by the wet-laid process are formed from glass fibers held together by a binder material. The last two patents (U.S. Pat. Nos. 5,914,365 and 6,642,299) relate to improved wet web strength with styrene-maleic anhydride copolymer (SMA), styrene-acrylate copolymers, and mixtures thereof. These binders have limited application due to high cost. In addition, they are petroleum based carbon positive materials which are not environmentally preferred.

Typically, in wet processed glass fiber mats, the binder is applied in liquid form and dispersed onto the glass fibers by a curtain type applicator. Conventional wet processes strive to produce a uniform coating of binder on the glass fibers. After the binder and glass fibers have been dried and cured, the glass fiber mat is cut as desired.

A major problem in the manufacturing process and use of some known fiber mats is inadequate wet web strength. The wet web strength of wet glass mat has significant impact on runability of glass mat production and mat properties. In order to prevent the wet (glass mat) web from breaking during production, the production line speed has to be reduced due to lower wet web strength of the glass mat prior to curing. Also, lower wet web strength requires higher vacuum draw to support the wet web and minimize web breaks. But higher vacuum draw will lead to undesired mat properties, such as a high mat tensile ratio (i.e. the ratio of dry to wet tensile strengths).

Inadequate dry mat tensile strengths also can reduce the ability of the finished roofing product to resist stresses during its service lifetime on the roof. Because building materials generally, and roofing shingles in particular, are often subjected to a variety of weather conditions, the fiber mats should also maintain their strength characteristics under a wide range of conditions.

Among the attempts of improving glass fiber mat tensile strength, U.S. Pat. No. 4,430,158 claims improved tensile strength to a sized glass fiber mat by adding an anionic surfactant, such as sodium dodecylbenzene sulfonate, to the urea formaldehyde binder system, and U.S. Pat. No. 4,542,068 discloses a method of making a glass fiber mat in which a synthetic styrene butadiene binder system plus an alkoxylated alkylamine is employed, while U.S. Pat. No. 7,272,915 describes a urea formaldehyde binder modified with acrylonitrile-butadiene-styrene copolymer providing increased tensile strength. A major problem in the manufacturing process and use of fiber mats is inadequate wet web strength, which cannot be provided by a urea formaldehyde resin without an additive, as illustrated by the related art described in this paragraph. In addition, since these binders are all petroleum based they are carbon positive materials and therefore not environmentally preferred.

U.S. Pat. No. 7,268,091 discloses a urea-formaldehyde fiber binder; and a vinylpyrrolidone/acrylic acid/lauryl methacrylate terpolymer. An aqueous binder composition containing a urea-formaldehyde resin modified with a water-soluble styrene-maleic anhydride copolymer is used in the preparation of fiber mats is described in U.S. Pat. No. 6,084,021. The main disadvantage of these binders is a necessity of preparing the binder before applying it on the glass fiber mat due to a limited stability of a resin/latex mixture. In addition, since these binders are petroleum based they are carbon positive materials which are not environmentally preferred.

In summary, various attempts have been made to reduce undesirable formaldehyde emissions as well as developing formaldehyde-free binders and use traditional modified starches and dextrins or other low performance bio-based materials. However, all of these to date have serious shortcomings such as high cost, high corrosivity, high viscosity, dark color, lack of rigidity, water sensitivity, poor bond strength, etc.

Multiple disclosures have been made regarding the composition and use of various forms of biopolymer nanoparticles. For instance, U.S. Pat. No. 6,677,386 (which corresponds to WO 00/69916) describes a process for producing biopolymer nanoparticles, which in one form are starch nanoparticles. In the process, the biopolymer is plasticized using shear forces, and a crosslinking agent is added during the processing. After the processing, the biopolymer nanoparticles can be dispersed in an aqueous medium. One version of the process results in starch nanoparticles which are characterized by an average particle size of less than 400 nanometers. The nanoparticles can be used as a matrix material wherein the matrix material may be a film-forming material, a thickener, a rheology modifier, an adhesive or an adhesive additive (tackifier). The nanoparticles or dispersions thereof may also be used for their barrier properties, as a carrier, fat replacer or medicament for mitigating dermal disorders. Further examples of applications for the nanoparticles or dispersions thereof are in the paper-making and packaging industry, agriculture and horticulture fields. The nanoparticles can also be used as excipients or carriers in medicines, where they may be complexed or covalently coupled to active substances such as slow-release drugs. The nanoparticles can also be processed into a foam at relatively high density.

Other uses of the nanoparticles of U.S. Pat. No. 6,667,386 can be found in: (i) U.S. Pat. No. 7,160,420 which describes the use of the starch nanoparticles as a wet-end additive in papermaking pulp slurry, or applied to the surface of the paper as a surface sizing agent; (ii) U.S. Pat. No. 6,825,252 which describes the use of the starch nanoparticles in a binder in a pigmented paper coating composition; (iii) U.S. Pat. No. 6,921,430 which describes the use of the starch nanoparticles in environmentally friendly adhesives; and (iv) U.S. Patent Application Publication No. 2004/0241382 which describes the use of the starch nanoparticles in an adhesive for producing corrugated board. The disclosure of these patents and published applications, and of all other publications referred to herein, are incorporated by reference as if fully set forth herein.

The invention in U.S. Pat. No. 6,667,386 relates to a process for producing biopolymer nanoparticles which in one form are starch nanoparticles characterized by an average particle size of less than 400 nanometers. The structure of the biopolymer nanoparticles has been described in the literature (see Bloembergen et al., "Specialty Biobased Monomers and Emulsion Polymers Derived from Starch", 2010 PTS Advanced Coating Fundamentals Symposium, Munich, Germany, Oct. 11-13, 2010). In dry form, the product consists of larger agglomerates with an average agglomerate particle size of ~300 μm (300,000 nm.), from which nanoparticles are released when they are dispersed in water. In dispersed form, the biopolymer nanoparticles exist as insoluble colloidal particles that form a biopolymer latex dispersion with an average size of ~100 nanometers. Each of the nanoparticles can be thought of as internally crosslinked macromolecular units with intra-particle crosslinks (FIG. 1). No inter-particle crosslinks exist, as this would result in poor rheology and reduced binding power (reduced surface area). Excellent paper coating binding strength and rheological properties (superior machine runability) have been reported by coated paper and board manufacturers and paper industry experts (see Klass, C. P., "New Nanoparticle Latex offers Natural Advantage", Paper360° Magazine, p. 30-31, January, 2007; Figliolino et al., "Reducing Carbon Footprint with Biolatex", Paper360° Magazine, p. 25-28, August, 2009; Lee et al., "Development of New Biobased Emulsion Binders", TAPPI, PaperCon2010, "Talent, Technology and Transformation", Atlanta, Ga., May 2-5, 2010; Greenall et al., "New generation of biobased latex coating binders for a sustainable future", Paper Technology 52, No. 1, Paper Industry Technical Ass'n, p. 10-14, February 2011; and Oberndorfer et al., "Coating & print performance of biobased latex in European graphic papers", TAPPI, PaperCon2011, "Rethink Paper: Lean and Green", Cincinnati, Ohio, May 1-5, 2011). The biopolymer latex binder provides a high performance substitute to the petrochemical-based binders used in coated paper and paperboard manufacturing processes at a lower cost per pound. Carboxylated or acrylonitrile or otherwise modified styrene butadiene (SB latex) and styrene acrylate (SA latex) are the dominant petrochemical-based binders used in coated paper and paperboard manufacturing. Currently, the industry consumes over 4 billion pounds of SB and SA latex per annum. As the price of oil continues to escalate, and as the price of synthetic binders has increased by more than 100% over the past few years, paper producers have faced increased production costs forcing them to find efficiencies, pass increases on to the consumer, or cease production. The biopolymer latex binder of U.S. Pat. No. 6,677,386 provides performance that is comparable to the petro-based SB and SA latex products for important paper properties such as coating gloss, brightness, whiteness, fluorescence, ink gloss, and printability, while providing superior performance to SB and SA Latex for water retention, opacity, dry pick, print mottle, porosity (blister resistance) and paper stiffness.

SUMMARY OF THE INVENTION

The following discussion is intended to introduce the reader to the detailed description, and not to limit any claimed invention. An invention may reside in any combination or sub-combination of elements or steps described in this summary, the figures or the detailed description.

This specification describes a curable composition, or binder. The composition includes a dispersion in water, optionally a latex, of particles comprising a biopolymer. Optionally, the particles may comprise a) particles comprising crosslinked biopolymers, b) particles having an average size of less than 400 nm, c) particles having a volume swell ratio of 2 or more or d) particles comprising starch. The composition may also include a crosslinking agent, in addition to any crosslinking agent that may have been previously used to make the particle.

Such a composition may be useful, for example, in providing an alternative means of binding fibers or wood to make products or materials such as, without limitation, fiberglass insulation or roofing shingles.

Optionally, the composition may include components from one or more other biopolymer or non-biopolymer soluble binders or latexes. For example, the composition may include a formaldehyde binder. Alternatively, the composition may include a substantially formaldehyde free (i.e. less than 1 ppm formaldehyde) binder such as a polycarboxylic acid binder or a polyester binder. Further alternatively, the composition may include an organic, but non-biopolymer, latex. In any of these or similar cases, the composition may be made for example by combining an aqueous dispersion comprising the particles with another aqueous binder, intermediate product or latex, by dispersing the particles into another binder, intermediate product or latex, or by dispersing, dissolving or forming components of another binder or latex in an aqueous dispersion comprising the particles.

The specification also describes a material or product. The material or product has a binder, un-cured in an intermediate form or cured in a finished form, comprising particles selected from the group consisting of a) particles made of crosslinked biopolymers, b) particles having an average size of less than 400 nm, c) particles having a volume swell ratio of 2 or more and d) particles comprising starch. The material or product also has mineral fibers or non-pulped wood.

In some parts of the specification, the inventors demonstrate, among other things, novel and non-obvious uses for biopolymer nanoparticles such as those described in U.S. Pat. No. 6,677,386, a new curable binder composition comprising biopolymer nanoparticles, in some applications with a multifunctional crosslinking agent, for use for example in the formation of mineral, natural organic, or synthetic fiber products, and for example mineral fiber insulation, nonwoven mats, fiberglass insulation and related glass fiber products, and wood based products, and construction materials. By "multifunctional crosslinking agent", we mean a crosslinking agent in addition to any crosslinking agent used to form the biopolymer nanoparticle, although the multifunctional crosslinking agent may comprise the same compound as a crosslinking agent used to form the particle. The multifunctional crosslinking agent has two or more functional groups (which may be the same type of functional group) capable of forming a bond, for example a covalent or ionic bond, with the nanoparticles and preferably with the fibers.

In some parts of the specification, curable aqueous compositions are described, for example a formulation comprising nanoparticles of crosslinked starch and a multifunctional crosslinking agent. Whereas the biopolymer nanoparticles in the aqueous dispersion may be already internally crosslinked within the nanoparticles via intra-particle crosslinks, the additional multifunctional crosslinking agent facilitates one or more interfacial crosslinks, such as crosslinks between particles or between particles and fibers, wood or other substrates. In an application wherein a curable aqueous composition is used to make fiberglass insulation, a multifunctional crosslinking agent is selected which lies at least partially dormant during the binder application stage and fiber mat formation and fluffing stages, but is triggered in the curing stage to react, or react further, and lock in the desired fiber mat dimensions. The high surface area of the biopolymer nanoparticles in the aqueous composition provides bonding for mineral, natural organic or synthetic fibers which is superior to, or at least offers an alternative to, water-soluble sugars, dextrins, industrial starches, carbohydrates or other natural polymers. The additional multifunctional crosslinking agent facilitates interfacial inter-particle crosslinks to provide useful fiber mat recovery (for insulation products) and dry and wet tensile strength properties.

The multifunctional crosslinker may be selected from dialdehydes, polyaldehydes, acid anhydrides or mixed anhydrides, (e.g. succinic and maleic anhydride), glutaraldehyde, glyoxal, oxidized carbohydrates, periodate-oxidized carbohydrates, epichlorohydrin, epoxides, triphosphates, petroleum-based monomeric, oligomeric and polymeric crosslinkers, biopolymer crosslinkers, divinyl sulphone, borax (e.g. $Na_2B_4O_7.5H_2O$, and $Na_2B_4O_7.10H_2O$ or $Na_2[B_4O_5(OH)_4].8H_2O$), isocyanates, polyacids and hydrolysable organo alkoxy silanes producing silanols. The crosslinking reaction may be acid-catalyzed or base-catalyzed. In one embodiment, suitable dialdehydes and polyaldehydes include glutaraldehyde, glyoxal, periodate-oxidized carbohydrates, and the like. Glyoxal, borax, epichlorohydrin, isocyanates, anhydrides, polyacids and silicates such as tetraethyl orthosilicate (TEOS) are particularly suitable crosslinkers. Such crosslinkers or others may be used alone or as a mixture of crosslinkers. The level of crosslinking agent can conveniently be between 0.1 and 10 weight % with respect to the total dry weight of the curable aqueous composition. The level of crosslinking agent can also be between 0.1 and 5 weight % with respect to the total dry weight of the curable aqueous composition. The level of crosslinking agent can also be between 0.5 and 5 weight % with respect to the total dry weight of the curable aqueous composition. The level of crosslinking agent can also be between 0.1 and 2 weight % with respect to the total dry weight of the curable aqueous composition.

A cured composition is described in this specification comprising a nonwoven fiber in a cured binder wherein the cured composition is formed by mixing fibers in a curable aqueous composition to form a mixture and curing the mixture.

A method for forming a non-woven material is described in this specification comprising: mixing fibers and said curable aqueous composition, and heating the curable composition and fibers at about 130 to about 230° C. for sufficient time to cure.

A method for binding together a loosely associated mat of glass fibers is described in this specification comprising contacting the glass fibers with an aqueous binder composition comprising an aqueous mixture of a substantially water-dilutable or dispersible adduct of co-condensation of urea, formaldehyde and nanoparticles of crosslinked biopolymer containing plurality of pendant hydroxyl groups and heating said composition at an elevated temperature to effect cure.

A glass fiber product is described in this specification comprising a crosslinked (cured) composition obtained by curing (drying at elevated temperature) an aqueous binder composition comprising a substantially water-dilutable or dispersible adduct of co-condensation of urea, formaldehyde and nanoparticles of crosslinked biopolymer containing plurality of pendant hydroxyl groups applied to a mat of nonwoven glass fiber.

A mineral, natural organic, or synthetic wool product is described in this specification comprising a crosslinked (cured) composition obtained by curing (drying at elevated temperature) an aqueous binder composition comprising a substantially water-dilutable or dispersible adduct of co-condensation of urea, formaldehyde and nanoparticles of crosslinked biopolymer containing plurality of pendant hydroxyl groups applied to a mat of nonwoven mineral, natural organic, or synthetic wool.

A composition is described in this specification comprising an aqueous solution comprising a curable binder, a dispersion of at least 25 wt % of particles in the aqueous solution and a crosslinker adapted to bond to the particles and to mineral fibers. The composition may be used to make mineral fiber insulation, for example fiberglass insulation. The curable binder may be a non-formaldehyde resin, for example polyacrylic acid (PAA) or polyester (PE).

A composition is described in this specification comprising a formaldehyde resin and a dispersion of up to 15 wt % of particles comprising crosslinked biopolymers. The composition may be used to make fiberglass roofing shingles.

A composite material is described in this specification comprising particles, fibers, and a crosslinker bonded to the fibers and the particles wherein the particles are selected from the group consisting of particles comprising crosslinked biopolymers, particles with an average size of less than 400 nm, and particles with a volume swell ratio greater than 2 or greater than 6.

A curable aqueous compositions for fiber mat formation described in this specification comprising a biopolymer latex formulation comprising nanoparticles of crosslinked starch and a multifunctional crosslinking agent. The multifunctional crosslinking agent may lie at least partially dormant during a binder application stage and fiber mat formation and fluffing stages, but is triggered in the curing stage to react, or react further, and lock in the desired fiber mat dimensions.

A curable aqueous composition for fiber mat formation described in this specification comprises a biopolymer latex formulation comprising nanoparticles of crosslinked starch and a multifunctional crosslinking agent wherein said multifunctional crosslinking agent facilitates interfacial inter-particle crosslinks.

A curable aqueous composition for fiber mat formation described in this specification comprises a biopolymer latex formulation comprising nanoparticles of crosslinked starch and a multifunctional crosslinking agent wherein said multifunctional crosslinking agent facilitates useful fiber mat recovery or dry or wet tensile strength properties.

A reduced total emission process for preparing a binder-coated nonwoven product described in this specification includes the preparation of a curable aqueous binder composition comprising biopolymer nanoparticles; applying the binder to the nonwoven fibers to form a binder-containing nonwoven mat; curing the binder-containing nonwoven mat at elevated temperatures to form the binder-coated nonwoven product.

DETAILED DESCRIPTION OF THE INVENTION

Figure 1:
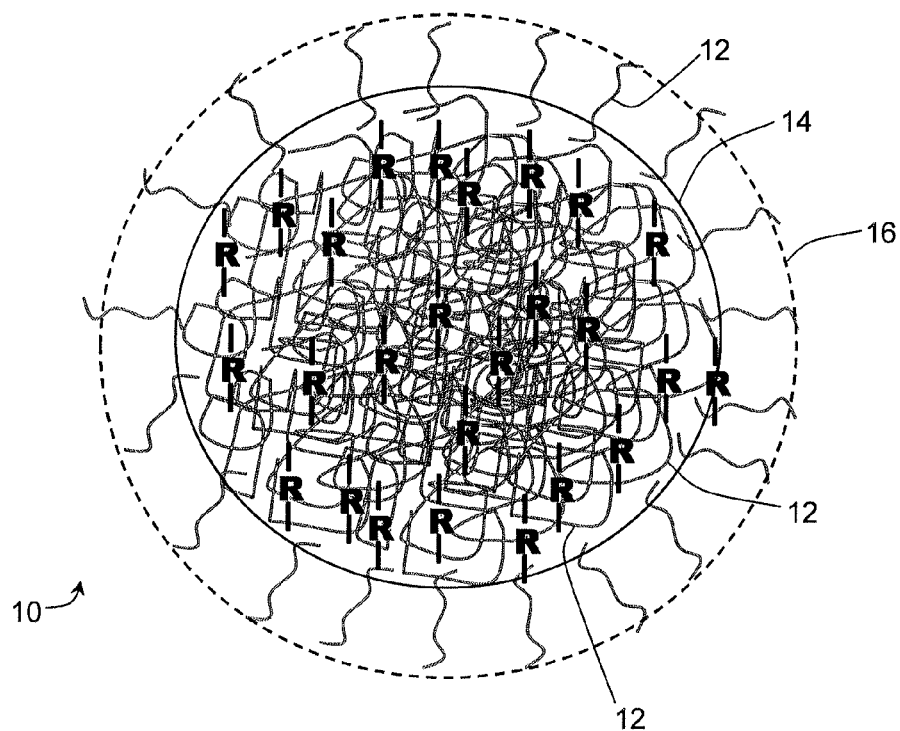
FIG. 1 is a schematic that illustrates the intra-particle crosslinked structure of a biopolymer nanoparticle, with "—R—" representing a crosslink between different starch polymers located within the biopolymer nanoparticle.

Before the present materials and methods are described, it is understood that this invention is not limited to the particular methodology, protocols, materials, and reagents described, as these may vary. It is also to be understood that the terminology used herein is for the purpose of describing particular embodiments only, and is not intended to limit the scope of the present invention.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. All publications and patents specifically mentioned herein are incorporated by reference for all purposes including describing and disclosing the chemicals, instruments, statistical analysis and methodologies which are reported in the publications which might be used in connection with the invention. Nothing herein is to be construed as an admission that the invention is not entitled to antedate such disclosure by virtue of prior invention.

By "biopolymer" we mean biopolymers such as starch, starch derivatives, and carbohydrates or other polysaccharides including cellulose, hemicellulose and gums, as well as proteins (e.g. gelatin, soy or whey or other protein), and mixtures thereof, that can be formed into nanoparticles. The biopolymers may be previously modified, e.g. with cationic groups, carboxymethyl groups, by acylation, phosphorylation, hydroxyalkylation, oxidation and the like. Starch, and mixtures of different starch species, and mixtures of starch with other (bio)polymers containing at least 50% starch are preferred. While all starches and modified starches and mixtures thereof can be used, especially preferred is high-amylopectin starch (i.e. low-amylose starch), i.e. starch having a content of at least 75%, preferably at least 90% of amylopectin, and more preferably at least 95% of amylopectin, such as waxy starch.

By "biopolymer nanoparticle" we mean a particle comprising crosslinked biopolymer molecules. A dispersion of biopolymer nanoparticles may include particles, or may have an average size (by number or mass, or the D50 value of an NTA measurement) of particle, between 1 and 2500 nanometers (nm), or between 1 and 1000 nm or between 1 and 400 nm. Particles within the smaller size ranges are preferred because they provide increased surface are for enhanced bonding, such as inter-particle bonding or bonding to fibers, wood or other substrates. Smaller particles are also easier to disperse or maintain in dispersion, and are more likely to form a colloid. However, in some applications, particles with an average size even larger than 2500 nm might be used.

The size of the particles can be determined by forming a dispersion of the particles and making a measurement using, for example, Nanoparticle Tracking Analysis (NTA) using an LM 20 tracking analysis device (NanoSight Ltd.) equipped with a blue laser (405 nm). This device uses a 50 mW laser operating in the CW mode to illuminate the particles. The light scattered by the particles is captured using a digital camera and the motion of each particle is tracked from frame to frame using NanoSight software. A high speed video is obtained (30 frames per second, average video about 30 s). The trajectories of individual particles are generated from the video sequence and the mean squared displacement determined for each particle. Typically at least 20 trajectories are acquired and 250 to 500 sets of trajectories (each set corresponding to an individual particle) are accumulated in a video sequence. The analysis of the mean squared displacement is used to calculate the diffusion coefficient and the hydrodynamic radius ($r_h$) is determined using the Stokes-Einstein equation. Thus, the diameter of each particle in the sample can be determined and a particle size distribution derived. Because a diffusion coefficient is obtained for each particle in the field of view, a particle size distribution can be obtained which does not assume a particular mathematical model as in dynamic laser light scattering (DLS) analysis.

As an alternative, DLS measurements may also be used. In that case, the dispersion is diluted as required by the instrument and preferably filtered to remove any remaining agglomerates. DLS and NTA are complementary, given that the NTA technique is a direct measurement of the diffusion coefficient for individual particles tracked via video tracking software (and relates that to particle diameter via the Stokes-Einstein equation), and can measure particles in the range of 50-1000 nm, while DLS can measure to smaller particle sizes below 50 nm. Other useful techniques include oscillating probe Atomic Force Microscopy (AFM), Scanning Electron Microscopy (SEM), Environmental SEM (ESEM), Transmission Electron Microscopy (TEM) and Scanning/Transmission Electron Microscopy (STEM).

By "biopolymer nanoparticle latex", "biopolymer latex" we mean a colloidal dispersion of biopolymer nanoparticles. The particles in a biopolymer latex typically have an average size between about 1 and 1000 nm.

By "starch" we mean a complex carbohydrate polymer which is insoluble in water. Starch is often found in the fruit, seeds, or tubers of plants. The major resources for starch production and consumption are corn, potatoes, wheat, tapioca and rice. Starch is a mix of two polymeric carbohydrates (polysaccharides) called amylose and amylopectin, in which the monomers are glucose units joined to one another head-to-tail forming alpha-1,4 linkages. The overall structure of amylopectin is not, however, simply a linear polysaccharide chain, since occasionally, two glucose units are joined via an alpha-1,6 linkage, forming a branch point. Structurally, the starch forms clusters of linear polymers, where the alpha-1,4 linked chains form linear columns of glucose units branching at the alpha-1,6 links. The relative content of amylose and amylopectin varies between starch species.

Note that EcoSynthetix®, EcoSphere®, and Biolatex®, are registered trademarks of EcoSynthetix Ltd. of Lansing, Mich., USA. EcoSphere® 2202 is a product comprising starch based, internally crosslinked colloid forming hydrogel (nanogel) particles having an average particle size under 400 nm available commercially from Ecosynthetix Inc. of Burlington, Ontario, Canada. In particular, the EcoSphere® 2202 particles have a number average particle size in the range of 50 to 150 nm and, considering a distribution of their particle sizes, are also predominantly in the range of 50 to 150 nm in size. These products are made primarily from starch along with other natural ingredients and chemical additives. The product is normally sold for to replace petroleum based latex binders in industrial applications, such as coated paper and paperboard. The product is provided in the form of a dry powder of agglomerated nanoparticles with a volume mean diameter of about 300 microns. When mixed in water and stirred, the agglomerates break apart and form a stable latex dispersion of the nanoparticles.

This specification describes, among other things, a novel and non-obvious use for biopolymer nanoparticles, such as those described in U.S. Pat. No. 6,677,386, in achieving a new curable binder composition comprising a biopolymer nanoparticle latex and a multifunctional crosslinking agent for use in the formation of mineral, natural organic, or synthetic fiber products, including mineral fiber insulation, non-woven mats, fiberglass insulation and related glass fiber products. The fibers may comprise natural fiber such as cellulose, sisal, wool, jute; synthetic fibers such as polyolefins, polyesters, acrylics, nylon, polyamides, ceramics, molten stone, stone wool, glass fibers, carbon fibers, aramid fibers, and the like, alone or in combinations with one another.

This specification describes a curable aqueous composition comprising a biopolymer latex formulation comprising nanoparticles of crosslinked starch and a multifunctional crosslinking agent. FIG. 1 illustrates how the biopolymer nanoparticle 10 can be thought of as one crosslinked macromolecular unit, with —R— representing crosslinks between polymer molecules 12, for example starch polymer molecules, located within the nanoparticle 10. Whereas the biopolymer nanoparticles in the aqueous dispersion are already internally crosslinked within the nanoparticles via intra-particle crosslinks (see FIG. 1), an additional multifunctional crosslinking agent may optionally be added to facilitate interfacial inter-particle crosslinks (shown as R or X in FIG. 2). Although crosslinking agents are inherently multifunctional, the term multifunctional crosslinking agent is used herein to help avoid confusion with crosslinking agent used to form the nanoparticle. Said multifunctional crosslinking agent is preferably designed to lie dormant, or at least to not fully react, during the binder application stage and the fiber mat formation and fluffing stages, but is triggered in the curing stage by heat, an increasing solids content, or both, to react, or further react, and lock in the desired fiber mat dimensions. The multifunctional crosslinking agent may further crosslink particles to a reinforcement material such as fibers or wood in a non-fibrous form, i.e. a form other than pulp. For example, TEOS has four reaction sites. One or more of these reaction sites may bond with a biopolymer nanoparticle before curing but, without intending to limit the invention to any particular theory, reactions at all four sites, with other nanoparticles, a fiber or wood, are not believed to occur until the composition is heated in a curing step.

Figure 2:
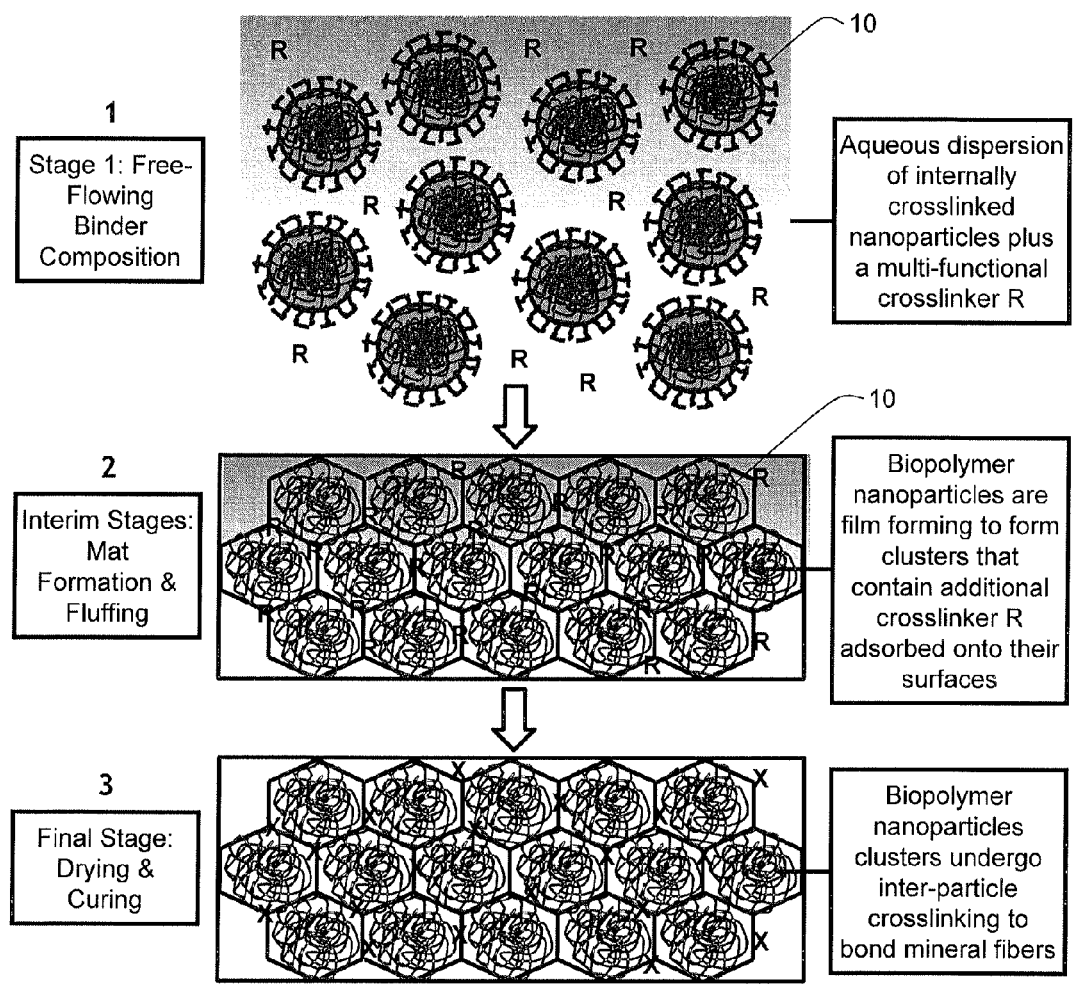
FIG. 2 is a schematic illustrating delayed inter-particle crosslinking of a biopolymer nanoparticle composition during the final drying and curing stage of a fiberglass insulation product, where "R" represents an unreacted multifunctional crosslinking reagent and "X" represents the reacted reagent facilitating inter-particle crosslinks; the interfacial inter-particle crosslinking agent lies at least partially dormant during the binder application stage and the fiber mat formation and fluffing stages, but is triggered in the curing stage to lock in the desired fiber mat dimensions.

As indicated in FIG. 2, biopolymer nanoparticles 10 of the type formed by crosslinking essentially non-crystalline starch molecules swell in water. The starch molecules are hydrophilic. At extremely low concentrations (ie. low volume fraction), for example, at a solids content of less than 0.5 wt %, the particles achieve a maximum swelling value that is a balance between their elastic constraint due to their crosslinked network and the high osmotic pressure at low concentration. The maximum swelling value (or volume factor) of the particles may be determined by measuring the relative viscosity, $\eta_r$, of a low concentration dispersion of the particles. The relative viscosity ($\eta_r = \eta/\eta_o$) of the dispersion is obtained by measuring the flow times between two demarcations of a glass Ubbelohde (or alternatively, Cannon Fenske) viscometer for the dispersion ($\eta$) and for its dispersion medium ($\eta_o$), which is water. Using the Einstein equation, $\eta_r = 1 + 2.5\,f\,\phi$, where f is the effective volume factor and $\phi$ is the volume fraction, one can obtain the effective volume factor (f) that is equal to the maximum volume swelling of the particles at low concentrations. The effective volume factors (i.e. the maximum volume swell ratios) of the particles varies with different crosslink densities, and may be for example between about 2 and 20, or between about 6 and 16.

The swelling occurs primarily in the core 14 (see FIG. 1) of the particle. The shell 16 (see FIG. 1) provides a steric stabilization mechanism that enhances the colloid forming nature and dispersion stability of the particles.

The particles de-swell to some extent when solids concentration increases, as occurs for compositions prepared at high solids, or when water is evaporated out of a dispersion during heat curing, as shown in FIG. 2. In particular, de-swelling will take place when the concentration of the dispersion exceeds that of the starch network in the nanoparticles which is equal to the reciprocal 1/SR(W) of the weight swell ratio, SR(W). For example, if SR(W) is 5, then starch nanoparticles will start de-swelling when the concentration of a crosslinked starch dispersion approaches or exceeds 20% solids.

Their hydrophilic nature combined with their internal crosslinking within the particles prevents them from both unrestricted swelling and complete de-swelling in aqueous suspensions and the particles can therefore be described as a hydrogel or nanogel. These nanogels are dynamic spheres that only reach their volume swell ratio at extreme dilution (<0.5 wt % solids), but then typically reach an estimated 2.2 volume factor at the more typical higher solids use levels (see Do lk Lee, Steven Bloembergen, and John van Leeuwen, "Development of New Biobased Emulsion Binders", TAPPI, PaperCon2010 Meeting, "Talent, Technology and Transformation", Atlanta, Ga., May 2-5, 2010). When dried during curing, crosslinked starch based particles have a density less than the density of a native starch granule. For example, a native starch granule may have a relative density of about 1.6 whereas a crosslinked starch particle may have a relative density approaching 1.0. While this hydrogel nature of certain particles may not be required in all applications, it is advantageous in at least some applications.

In general, the cost and energy required to produce a material varies with its weight. However, the ability of the particles to function as a binder is related to their volume. Accordingly, a less dense particle can provide a more efficient use of material, and a lighter finished product. Further, in the case of insulating products, the rate of heat transfer tends to decrease with density and so a hydrogel form of a material may provide better thermal performance in an insulation product.

In the case of an insulation product, the hydrogel nature of some particles is also well adapted to standard fiberglass insulation production methods. In stage 1 (see FIG. 2) the dispersion is free flowing, and may be applied by sprayers typically used in fiberglass insulation making. Stage 2 may be viewed as covering the time from when the spray contacts the fibers to when fiber temperature begins to rise again when the fiber matt enters Stage 3. During stage 2, some water evaporates and the dispersion reaches a solids concentration in which the particles contact each other. The dispersion then becomes film forming but is still flowable and tends to accumulate at binding locations such as intersections between fibers where the fibers contact each other or come close to contacting each other. During stage 3, the particles become immobile around intersections between fibers and so bind the fibers together.

Figure 3:
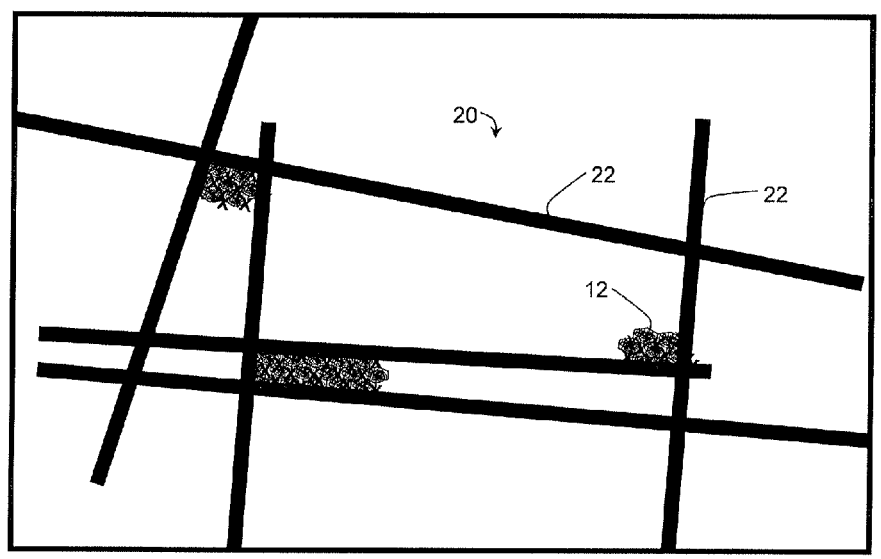
FIG. 3 is a schematic of a cured mineral, natural organic, or synthetic fiber product made from a curable aqueous composition comprising biopolymer nanoparticles of crosslinked starch and a multifunctional crosslinking agent.

FIG. 3 illustrates a schematic of a cured product 20 made with mineral, natural organic, or synthetic fibers 22 bound with biopolymer nanoparticles 12. The product has effective chamber formation that results from the curable aqueous composition, for example a composition comprising biopolymer nanoparticles, or for example a biopolymer latex formulation comprising nanoparticles of crosslinked starch and a multifunctional crosslinking agent. Effective chamber formation is important in fiberglass manufacturing in order to provide acceptable insulation, fiber mat strength, compactability and recovery properties.

Figure 4:
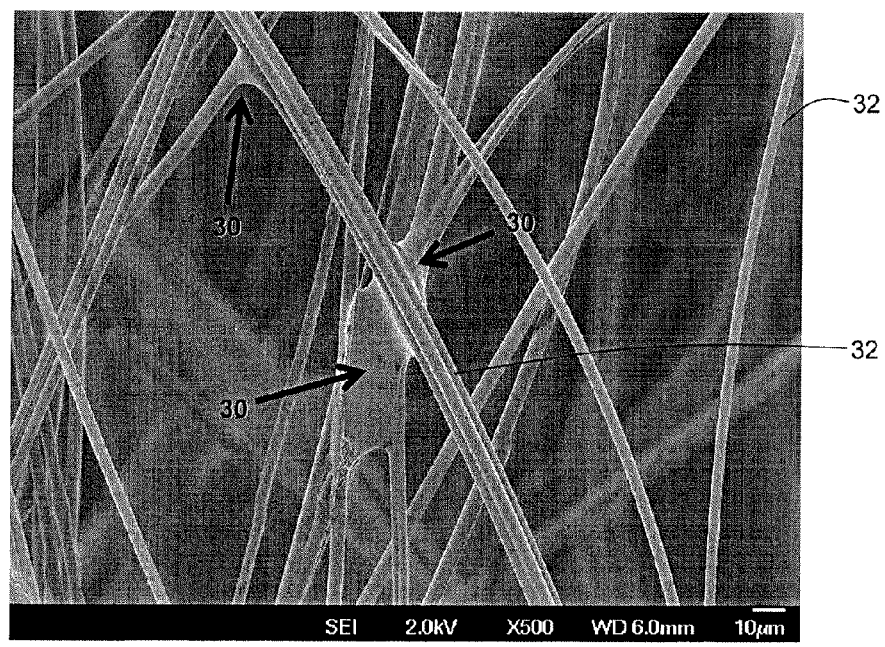
FIG. 4 is an SEM micrograph (at 500× magnification) of a glass fiber mat to which a biopolymer latex formulation comprising nanoparticles of crosslinked starch and a multifunctional crosslinking agent has been added following which it was cured, and serves to illustrate "spot welding", or fiber to fiber bonding, with the biopolymer latex binder composition containing a multifunctional crosslinker.

FIG. 4 provides an SEM micrograph (at 500× magnification) of a non-woven mat of glass fibers 32 to which a biopolymer latex formulation comprising nanoparticles of crosslinked starch and a multifunctional crosslinking agent has been added following which it was cured. Binding locations 32 comprising cured products of the formulation are visible at fiber intersections.

Figure 5:
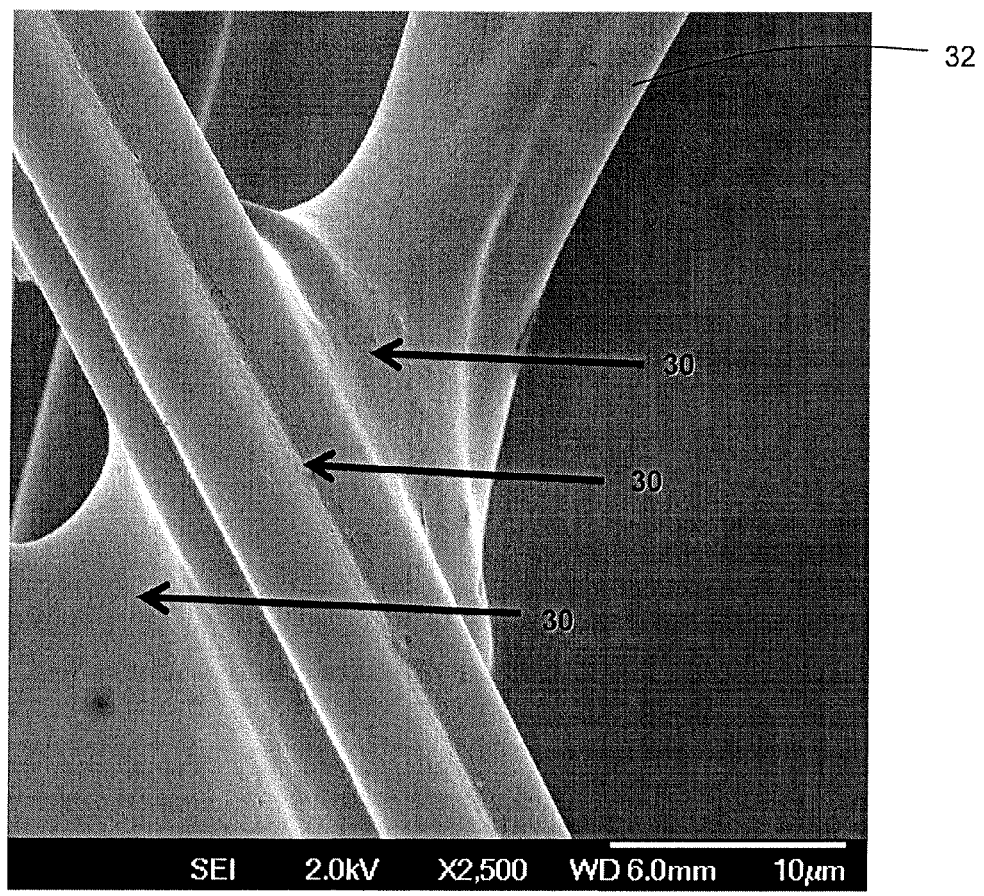
FIG. 5 is an SEM micrograph (at 2,500× magnification) of a glass fiber mat to which a biopolymer latex formulation comprising nanoparticles of crosslinked starch and a multifunctional crosslinking agent has been added following which it was cured, and serves to illustrate extensive inter-fiber "spot welding", or fiber to fiber bonding, with the biopolymer latex binder/multifunctional crosslinker composition.
Figure 6:
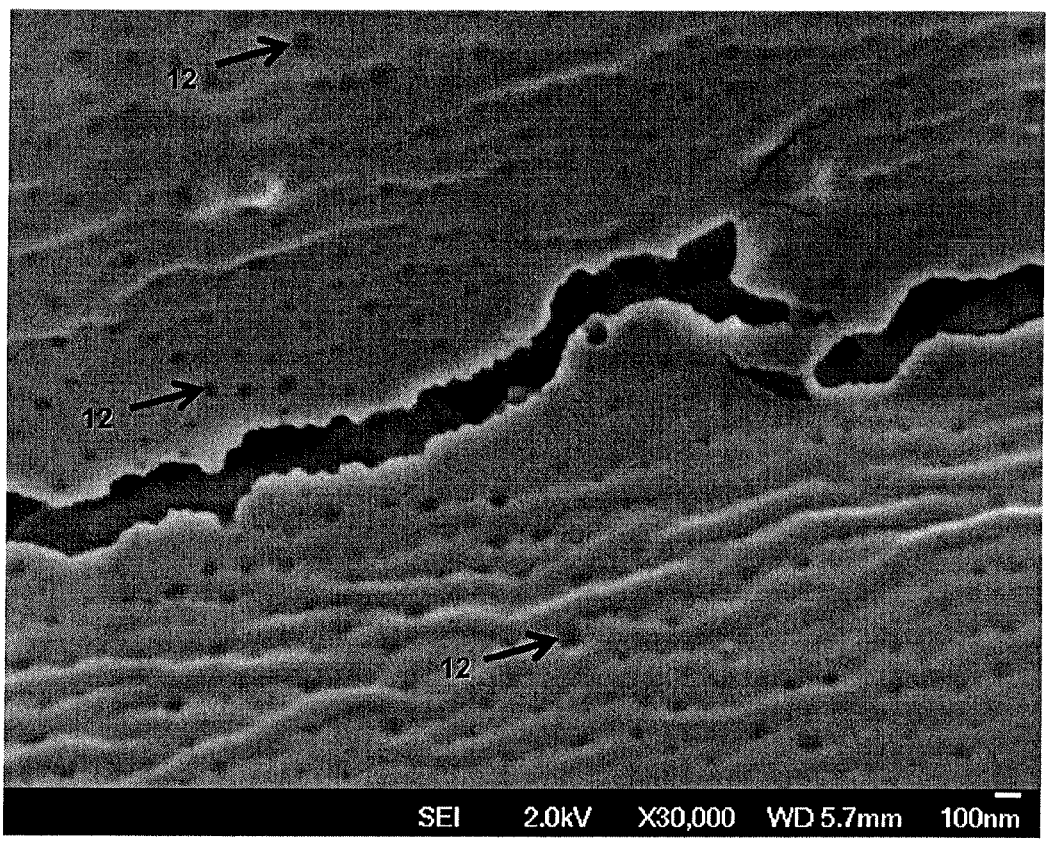
FIG. 6 is a High Resolution SEM micrograph (at 30,000× magnification) of a spot weld, or fiber to fiber bond, area in a fiber mat made with a cured binder composition consisting of 50% polyacrylic acid (PAA) resin-50% biopolymer latex binder by solids weight composition containing a multifunctional crosslinker.

FIG. 5 is an SEM micrograph of a glass fiber 32 mat to which a biopolymer latex formulation comprising nanoparticles of crosslinked starch and a multifunctional crosslinking agent has been added following which it was cured, and this higher resolution SEM micrograph (at 2,500× magnification) serves to illustrate extensive interfiber "spot welding", or fiber to fiber bonding, at binding locations 30 with the biopolymer latex binder/multifunctional crosslinker composition. FIG. 6 is a high resolution SEM micrograph at 30,000× of a spot weld, or fiber to fiber bond, area within a binding location 30 in a fiber mat cured with a binder composition consisting of 50% wt % polyacrylic acid (PAA) and 50 wt % biopolymer latex, and the binder composition containing 1% TEOS as a multifunctional crosslinker. The biopolymer nanoparticles 12 are clearly visible in the high resolution micrograph depicted in FIG. 6, that is, at least those located at or near the surface of the cured polymer blend.

The high surface area of the biopolymer nanoparticles in the aqueous dispersion, and in particular a biopolymer latex, in itself provides bonding for mineral fibers while the additional multifunctional crosslinking agent facilitates interfacial inter-particle crosslinks, and/or crosslinks to the fibers. The bonding provides fiber mat recovery when used to make insulation products and dry and wet tensile strength sufficient for various products, such as asphalt shingles.

Biopolymer nanoparticles can be formed as prescribed in U.S. Pat. No. 6,677,386 (which corresponds to International Publication WO 00/69916). In that process, a biopolymer, such a starch comprising amylose or amylopectin or both, is combined with a plasticizer. This combination is mixed under high shear forces, preferably in a twin screw fully intermeshing co-rotating extruder, to plasticize the biopolymer and create a thermoplastic melt phase in which the crystalline structure of the biopolymer is removed. A crosslinking agent is then added while mixing continues to form crosslinked nanoparticles. The nanoparticles exit the extruder as a strand, which is ground to a fine dry powder. The starch based nanoparticles are present in the powder in agglomerated form, and can be dispersed in an aqueous medium.

The biopolymers may be starch or other polysaccharides such as cellulose and gums, as well as proteins (e.g. gelatin, soy, whey and other proteins), and mixture thereof. The biopolymers may be previously modified, e.g. with cationic groups, carboxymethyl groups, by acylation, phosphorylation, hydroxyalkylation, oxidation and the like. Starch and mixtures of at least 50% starch with other polymers are preferred. The starting material may be a native or granular starch selected from the group consisting of, for example, potatoes, rice, tapioca, corn, peas, rye, oats, wheat, and combinations thereof. The starch, whether used alone or in a mixture, is preferably a high molecular weight starch, for example a molecular weight of at least 10,000, and not dextran or dextrin. For example, the starch may be made up of amylose or amylopectin or both. Waxy starches, such as waxy corn starch, are particularly preferred.

The following five paragraphs are repeated or summarized from U.S. Pat. No. 6,677,386 to further describe the process of making the nanoparticles.

The biopolymer preferably has a dry substance content of at least 50% by weight at the time when processing starts. Processing is preferably done at a temperature of at least 40 degrees C., but below the degradation temperature of the polymer, for example 200 degrees C. The shear can be effected by applying at least 100 J of specific mechanical energy (SME) per g of biopolymer. Depending on the processing apparatus used the minimum energy may be higher; also when non-pregelatinised material is used, the minimum SME may be higher, e.g. at least 250 J/g, especially at least 500 J/g.

The plasticiser may be water or an alcohol or polyol (ethyleneglycol, propyleneglycol, polyglycols, glycerol, sugar alcohols, urea, citric acid esters, etc.). The total amount of plasticisers (i.e. water and others such as glycerol) is preferably between 15 and 50%. A lubricant, such as lecithin, other phospholipids or monoglycerides, may also be present, e.g. at a level of 0.5-2.5% by weight. An acid, preferably a solid or semi-solid organic acid, such as maleic acid, citric acid, oxalic, lactic, gluconic acid, or a carbohydrate-degrading enzyme, such as amylase, may be present at a level of 0.01-5% by weight of biopolymer. Without intending to limit the invention to any theory, the acid or enzyme may function in part by assisting in slight depolymerization which is assumed to be advantageous in the process of producing nanoparticles.

The crosslinking is preferably at least in part reversible, i.e. the crosslinks are partly or wholly cleaved during the mechanical treatment step. Examples of reversible crosslinkers are a) dialdehydes and polyaldehydes, which form more stable full acetals and reversibly form hemiacetals, and b) anhydrides, which form ester linkages (e.g. succinic and acetic anhydride) and the like. Suitable dialdehydes and polyaldehydes are glutaraldehyde, glyoxal, periodate-oxidised carbohydrates, and the like.

Such crosslinkers may be used alone or as a mixture of reversible crosslinkers, or as a mixture of reversible and non-reversible crosslinkers. Thus, conventional crosslinkers such as epichlorohydrin and other epoxides, triphosphates, divinyl sulphone, can be used as non-reversible crosslinkers for polysaccharide biopolymers, while dialdehydes, thiol reagents and the like may be used for proteinaceous biopolymers. The crosslinking reaction may be acid- or base-catalysed. The level of crosslinking agent can conveniently be between 0.1 and 10 weight % with respect to the biopolymer. The crosslinking agent may already be present at the start of the mechanical treatment, but in case of a non-pre-gelatinised biopolymer such as granular starch, it is preferred that the crosslinking agent is added later on, i.e. during the mechanical treatment.

The mechanically treated, crosslinked biopolymer is then formed into a latex by dispersion in a suitable medium, usually water and/or another hydroxylic solvent such as an alcohol), to a concentration of between 4 and 50 weight % especially between 10 and 40 wt. %. Prior to the dispersion a cryogenic grinding step may be performed, but stirring with mild heating may work equally well. This treatment results in a gel which either spontaneously or after induction by water adsorption, is broken into a latex. This viscosity behaviour can be utilised for applications of the particles, such as improved mixing, etc. If desired, the dispersed biopolymer may be further crosslinked, using the same or other crosslinking agents as describe above. The extrudate is characterised by swelling in an aqueous solvent, e.g. water or a mixture of at least 50% water with a water-miscible solvent such as an alcohol, and by exhibiting a viscosity drop afterwards to produce a dispersion of nanoparticles.

International Patent Application Publication No. WO 2008/022127 A2 and its equivalent US Patent Application Publication Number 2011/0042841 A1 describe a process for producing biopolymer nanoparticles in large quantities. US Patent Application Publication Numbers 2010/0143738 A1 describes a process for producing biopolymer nanoparticles conjugative with additives during the extrusion process. These publications are incorporated by reference.

The production of biopolymer nanoparticles similarly formed by reactive extrusion and comprising starch essentially without crystalline structures is described in *Starch nanoparticle formation via reactive extrusion and related mechanism study*, Delong Song et al., Carbohydrate Polymers 85 (2011) 208-214. Using various materials and reaction conditions, dispersions having particles with number average particle sizes up to about 2000 nm were produced. Various other methods of making biopolymer nanoparticles are also summarized in this paper.

Another method reported to produce biopolymer nanoparticles by reactive extrusion process from waxy corn starch is described in International Publication Number WO 2011/071742 A2, Process for Preparing Stable Starch Dispersions, by Welsch et al., published on Jun. 16, 2011. This process comprises introducing a feed starch and an hydroxylic liquid to an extruder. Shear forces are applied in the extruder to the starch and the liquid in the substantial absence of a crosslinker under conditions sufficient to prepare a stable dispersion of starch particles in the hydroxylic liquid.

Another method reported to produce biopolymer nanoparticles is described in International Publication Number WO 2011/155979 A2, Process for Preparing Stable Dispersions of Starch Particles, by Welsch et al., published on Dec. 15, 2011. In this process, a feed starch and an aqueous liquid are introduced into a rotor stator mixer. The feed starch and aqueous liquid are maintained in the rotor stator mixer at a temperature ranging from a gelation temperature to less than a solubilization temperature. The feed starch is sheared into starch particles with the rotor stator mixer to form the dispersion of starch particles in the aqueous liquid.

Another method of producing a starch nanoparticle is described in U.S. Pat. No. 6,755,915 to Van Soest et al. (Jun. 29, 2004) which teaches a method of preparing starch particles with a size range of 50 nanometers to 100 microns. The method includes the steps of: dispersing starch in a first water phase; dispersing a second hydrophobic phase in the first phase to form an oil-in-water emulsion; inverting the oil-in-water emulsion to a water-in-oil emulsion; crosslinking the starch in the first phase; and separating the formed starch particles. The phase inversion can occur by including a surfactant that stabilizes a water-in-oil emulsion or the surfactant can be temperature sensitive and increasing the reaction temperature. The inversion can also occur by the addition of further hydrophobic liquids or various suitable salts. In this process the starch molecules can remain partially granular during both the crosslinking reaction and complete gelatinisation of the granular starch can be effected before, during or after the phase inversion. Gelatinization occurs by increased temperature, salts or combinations thereof.

Another method of making biopolymer nanoparticles is described in WO 2010/084088 to Santander Ortegea et al. (international publication Jul. 29, 2010). The method includes the steps of preparing starch derivatives by a first disintegration step, with solvent and increased temperatures, followed by common substitution methods, such as esterification, etherification. The starch derivatives are added to an organic solvent and an oil/water emulsion is prepared with a high shear mixer. Sonication may be used to improve the oil droplet distribution. The organic phase is then removed through a membrane, which results in an aqueous dispersion of starch-based nanoparticles.

Another method of making biopolymer nanoparticles is described in GB 1,420,392 to Beersma which teaches a method of forming starch particles by crosslinking native starch granules and then fragmenting the crosslinked starch granules with heat and pressure in an extruder.

Another method of making biopolymer nanoparticles is described in WO 2010/065750 to Bloembergen et al. which teaches that Brabender static high shear mixers and Sigma Blade mixers may be used in place of an extruder to produce nanoparticles by way of shearing starch granules in the presence of a crosslinker.

The nanoparticles may form a colloid or latex in water. The particles may be made up of water-swollen crosslinked hydrophilic polymers. The polymers may have hydroxyl functional groups. The particles may swell by an effective volume factor (maximum volume swell ratio in water) of 2 or more or 6 or more.

The binder composition may include as the multifunctional crosslinking agent polyacids having at least two acidic functional groups that will react with the alcohol moieties on the starch particles. It is preferred to use nonpolymeric inorganic or organic mono or polyacids. Nonpolymeric polyacids include at least one of citric acid, maleic acid, succinic acid, phthalic acid, glutaric acid, malic acid, oxalic acid or the like, and salts thereof.

The binder composition may include as the multifunctional crosslinking agent an anhydride of the nonpolymeric polyacid. These anhydrides include at least one of maleic anhydride, succinic anhydride, phthalic anhydride and the like.

The binder composition may contain as a plasticizer and/or processing aid a polyol of a wide variety of materials, including, but not limited to, ethylene glycol (to make 2,3-dihydroxydioxane), diethylene glycol, dialkylene glycol (to make an oligomeric condensation product) such as 1,2-propylene glycol, 1,3-propylene glycol, 1,2-butylene glycol, 1,3-butylene glycol, 1,4-butylene glycol, polyethylene glycols having the formula $HO(CH_2CH_2O)_nH$ where n is 1 to about 50, silanols (as products of hydrolysis of organosiloxanes), and the like, and their mixtures. Other suitable polyols (i.e. containing at least three hydroxy groups) can be used, such as glycerin, (to make 2,3-dihydroxy-5-hydroxymethyl dioxane) as well as unalkylated or partially alkylated polymeric glyoxal derived glycols such as poly (N-1',2'-dihydroxyethyl-ethylene urea), dextrans, glyceryl monostearate, ascorbic acid, erythrobic acid, sorbic acid, ascorbyl palmitate, calcium ascorbate, calcium sorbate, potassium sorbate, sodium ascorbate, sodium sorbate, monoglycerides of edible fats or oils or edible fat-forming acids, inositol, sodium tartrate, sodium potassium tartrate, glycerol monocaprate, sorbose monoglyceride citrate, polyvinyl alcohol, α-D-methylglucoside, sorbitol, dextrose, and their mixtures.

The binder, alternatively called a curable aqueous composition, is prepared in one form comprising biopolymer nanoparticles, optionally with a multifunctional crosslinker. The biopolymer nanoparticles are dispersed in water and/or hydroxylic solvent (such as an alcohol), to a concentration of biopolymer nanoparticles of between 4 and 50 wt %, or between 4 and 20 wt %, or between 10 and 20 wt %, on application to wood or fibers or prior to curing, usually at the application site where it is combined with the fibers and then cured. Optionally, the binder may also contain, or be mixed with, one or more other binders, alternatively called resins or aqueous curable compositions, known in the art (for example the binders described in the background section herein) or other binders, known now or developed in the future, useful for binding fibers or wood together. When combined with another binder, the concentration of biopolymer nanoparticles and the components fo the other binder may be between 4 and 50 wt %, or between 4 and 20 wt %, or between 10 and 20 wt %, on application to wood or fibers or prior to curing. Optionally, the binder or curable aqueous composition may contain a multifunctional crosslinker or other additives. Optionally, the binder may contain another latex, for example an SB latex, or an extender. The curable aqueous composition may provide a partial or complete replacement for a formaldehyde-based binder or another non-biopolymer binder, or a latex component of a binder system. The curable aqueous composition may be used in combination with soluble binders, including a formaldehyde-based binder or other petro-chemical based polymer binder, or a latex component of a binder system. A formaldehyde free binder system may be made by using the curable aqueous composition alone or in combination with a non-formaldehyde binder system, which may be an organic, for example petro-chemical based, system such as one using polyacrylic amide (PAA) or polyester (PE) resins, or a biopolymer system using, for example, a soluble protein, starches, dextrin or other biopolymer. Curing of a binder or curable aqueous composition may be by way of film forming, by chemical reaction such as polymerization or crosslinking, or both.

One method for forming a non-woven material comprises: mixing fibers with a binder, and heating the binder and fibers at about 130 to about 230° C. for sufficient time to cure. Preferably, the binder comprises up to 95% by weight of water immediately prior to curing. Most preferably, the binder comprises 85 to 95% by weight of water immediately prior to curing. The binder and fibers can also be heated at about 180° C. to about 220° C. for sufficient time to cure.

A biopolymer latex is substantially water-dilutable. The binder can be mixed with the nonwoven fiber material by spraying, soaking or other suitable methods commonly used by the industry. The material is then dried and the binder is cured in an oven at elevated temperatures, generally at about 130 to 230° C. providing for the formation of a rigid thermoset polymer.

The curable aqueous composition may include other components, e.g., emulsifiers, plasticizers, anti-foaming agents, biocide additives, anti-mycosis including, e.g., fungicides and mold inhibitors, adhesion promoting agents, colorants, waxes, antioxidants, and combinations thereof.

The curable aqueous composition can be used to prepare nonwoven products by a variety of methods known in the art, which, in one embodiment, involves the impregnation of a loosely assembled mass of fibers with the binder solution to form a mat. The fibers may comprise natural fiber such as cellulose, sisal, wool, jute; synthetic fibers such as polyolefins, polyesters, acrylics, nylon, polyamides, ceramics, molten stone, stone wool, glass fibers, carbon fibers, aramid fibers, and the like, alone or in combinations with one another. The product may be used, for example, in building insulation, a roofing fiberglass mat, construction materials, or a nonwoven filtration material.

In various trials, fiberglass insulation batts were made using binder compositions comprising a blend of 100 parts EcoSphere®2202 starch based biopolymer nanoparticles with an average size of less than 400 nm, 100 parts of a second binder and 1 part of TEOS, all parts on a dry solids basis. In different trials, PAA and polyester (PE) were used as the second binder. The compositions were used to manufacture a glass fiber insulation product on a standard fiberglass bat manufacturing line. The binder was sprayed onto glass fibers using high pressure nozzles already present in the manufacturing line. The fibers were then collected, formed into a mat, fluffed, and heated in an oven to the cure temperatures of the binder mix. The cured glass fiber insulation samples had cured binder contents between 3 and 10% by weight as determined by loss on ignition (LOI); thicknesses of 70 to 300 mm; and, densities of 7 to 10 kg/m$^3$. The binder content, thickness and densities were varied to produce different grades (R values) of the resulting insulation products. The product was then downsized to an appropriate length and width, compressed and packaged in a bag. The bats recovered their design thickness after the bags were opened.

To make roofing shingles, mineral, natural organic, or synthetic fibers, typically glass fibers, may be formed in a slurry and placed on a support to form a mat. A curable aqueous composition is coated on the mat, preferably wetting the mat. The mat is then heated, for example between about 130 and about 230° C., for sufficient time to cure the curable aqueous composition. The bonded mat is then coated with asphalt, or bitumen. The curable aqueous composition may be mixed with a formaldehyde based resin, for example with an adduct of co-condensation of urea (or phenol, melamine or mixtures thereof) and formaldehyde, which may also function as a multi-functional crosslinker for the curable aqueous composition. A petro-chemical latex may also be part of the composition.

A curable aqueous composition can also be used to prepare wood based products such as particle board, plywood and oriented strand board (OSB) products. These products may be made, for example, from wood in a non-fibrous form, ie. a form other than pulp, such as wood chips, sawmill shavings, saw dust, wood veneers, wood strips, and mixtures thereof. In making particle board, wood particles, such as wood chips, sawmill shavings, or saw dust, are mixed with the curable aqueous composition. Once the composition has been mixed with the particles, the mixture is made into a sheet. The sheets formed are then cold-compressed to reduce their thickness, and later they are compressed again, under pressure (e.g., between two and three megapascals) and temperatures between about 130 and about 230° C. In making plywood, the curable aqueous composition is placed between wood veneers to form a sheet, and the sheets are compressed under pressure and temperatures between about 130 and about 230° C. In making OSB, wood is shredded into strips, which are then oriented on a belt to make a mat. The mat is placed in a thermal press to compress the strips and bond them by heat activation at between about 130 and about 230° C. to cure the curable aqueous composition that has been coated on the strips.

Optionally, a curable aqueous composition comprises a biopolymer nanoparticle latex and a multifunctional cross-linking agent. The composition may be used in the formation of mineral, natural organic, or synthetic fiber products, including mineral fiber insulation, non-woven mats, fiberglass insulation and related glass fiber products. A curable aqueous composition may also be used in combination with another binder, including a non-formaldehyde binder such as PAA or PE.

EXAMPLES

The following Examples and are not intended to limit the claims.

Example 1

Preparation of Biopolymer Binder Composition

The technique described in U.S. Pat. No. 6,677,386 has been used to prepare biopolymer nanoparticles by reactive extrusion processing. Native potato starch, corn starch, tapioca and waxy corn starch have been used to prepare nanoparticles. Agglomerated particles of such nanoparticles are commercially available, sold under the trademark EcoSphere, from Ecosynthetix Inc. Dry EcoSphere®2202 extruded powder comprising starch nanoparticle agglomerates were dispersed in water using mechanical agitation. The nanoparticles at 35% (w/v) solids were dispersed in 15 minutes at 45° C. using a 3-blade mixer at 200 rpm. The crosslinker tetraethyl orthosilicate (TEOS) was added in amount of 1 wt % (based on dry solids) and mixed for 30 minutes. After that the pH was adjusted to 7.0 with aqua ammonia. The binder is a low viscosity liquid. The stability of the resulting biopolymer binder is about 1 month at room temperature.

Example 2

Preparation of Blends of Biopolymer Binder

Glass fiber binder compositions were prepared using the biopolymer of Example 1 mixed with 25, 40 and 50 parts (dry basis) of polyester as described in Example 3 of WO 03/106561 at room temperature. A crosslinker (TEOS) was added in the amount of 1% by weight (based on dry solids) and mixed for 30 minutes. No crosslinker was added to the control binder compositions. After that the pH was adjusted to 7.0 with aqua ammonia. In addition, a glass fiber binder composition was prepared using the biopolymer of Example 1 mixed with 50 parts (dry basis) of polyacrylic binder as described in the example of U.S. Pat. No. 6,331,350 at room temperature. A crosslinker (tetraethyl orthosilicate) was added in the amount of 1% wt (based on dry solids) and mixed for 30 minutes. After that the pH was adjusted to 7.0 with aqua ammonia. No crosslinker was added to the control binder composition.

Example 3

Tensile Testing of Cured Glass Fiber Specimens

The biopolymer binder composition of Example 1 prepared from dry EcoSphere® 2202 biopolymer latex powder to give a 35% solids dispersions was subsequently diluted with water to give a binder dispersion having 15% non-volatiles, and the binder solution was applied to a glass fiber substrate as follows. Glass paper (Whatman 934-AH) was soaked in the binder solution for 5 minutes, then the excess liquid was removed by vacuum. The samples were put into an oven at 200° C. for 5 minutes for curing of the binder resin. The cured samples were cut into specimens having the dimensions of 6"×1" and tested for dry tensile strength by an Instron tensile tester. For wet tensile testing, the specimens were treated with hot water at 80° C. for 10 minutes, and then tested for tensile strength while still wet. The test results are presented in the Table 1, where Comparative A is polyester binder as described in WO 03/106561; comparative B is a pure polyacrylic binder at 15% solids as described in U.S. Pat. No. 6,331,350; C is a pure biopolymer nanoparticle latex binder dispersion at 15% solids (based on EcoSphere® 2202 biopolymer latex binder); C* is as C, but with 1% of tetraethyl orthosilicate (TEOS) crosslinker added; D is a 40/60 blend of A and C; D* is a 40/60 blend of A and C* (with 1% TEOS crosslinker added); E is a 25/75 blend of A and C; F is a 50/50 blend of A and C; G is a 50/50 blend of B and C; and G* is a 50/50 blend of B and C* (with 1% TEOS crosslinker added).

TABLE 1

Tensile Strength of Nonwovens

| Binder | Crosslinker Added | Dry strength, kgf | Wet strength, kgf | Retention, % |
|---|---|---|---|---|
| Comparative A | No | 35.1 | 18.4 | 52.4 |
| Comparative B | No | 25.9 | 17.3 | 66.8 |
| C | No | 19.4 | 3.5 | 18.0 |
| C* | Yes | 18.4 | 9.5 | 51.3 |
| D | No | 24.0 | 17.1 | 71.3 |
| D* | Yes | 26.6 | 22.3 | 83.8 |
| E | No | 24.4 | 15.6 | 63.9 |
| F | No | 24.8 | 17.9 | 72.2 |
| G | No | 28.9 | 16.1 | 55.7 |
| G* | Yes | 28.7 | 22.2 | 77.5 |

The results indicate that addition of a small amount of a multifunctional crosslinker, such as the TEOS silane crosslinker (0.5 to 1.5 wt %, dry basis), significantly improves the wet strength of the fiber mat and the Retention, a key performance attribute. The Retention was calculated as a ratio of Wet Strength/Dry Strength in percent. The tensile strength was measured as the maximum load in kgf at break.

Example 4

UF-Biopolymer Latex Binder Preparation

A resin of 60% solids, having a formaldehyde-urea mole ratio of 1.65:1, and having a final viscosity of "O" on the Gardner-Holdt scale was prepared. A stirred reactor was charged with the required quantities of 50 wt % aqueous formaldehyde solution (formalin), urea and nano-starch EcoSphere® 2202 biopolymer latex binder at 15% solids. After an initial 15-minute reflux, the pH was adjusted to 6.5 with formic acid and then the reflux was continued to the desired viscosity ("O" on the Gardner-Holdt scale). The pH was then was adjusted to 7.5 with 28% ammonium-hydroxide and the resin solution was concentrated to 60% solids by vacuum distillation. A comparative UF resin containing an additive comprising poly(styrene-co-methacrylic acid) was prepared without the addition of nano-starch, as described in U.S. Pat. No. 6,642,299.

Example 5

Treatment of Nonwovens and Tensile Testing of Treated Nonwovens

The binder compositions of Example 4 were applied to a glass fiber specimen (Whatman 934-AH) by saturation method and the excess binder was recovered by vacuum, and the specimen was then cured in the oven at 200° C. for 5 minutes. The binder add-on was 28%±2% (dry binder weight based on the weight of glass). The testing procedure is described in Example 3. The test results are presented in Table 2 where Comparative H contains urea-formaldehyde resin modified with an additive comprising poly(styrene-co-methacrylic acid); J contains urea-formaldehyde resin that was first prepared and then modified with an additive comprising EcoSphere® (Post-added); K contains urea-formaldehyde resin that was modified in the presence of an additive comprising EcoSphere® (Cooked-in).

TABLE 2

Tensile Testing of Treated Nonwovens

| Sample | Biopolymer Latex Binder | Shelf Life Stability | Dry Tensile (kgf) | Wet Tensile (kgf) | Retention, % |
|---|---|---|---|---|---|
| Comparative H | None | 3-5 hrs | 5.71 | 5.64 | 98.7 |
| J | Post-added | 3 weeks | 4.52 | 3.84 | 84.9 |
| K | Cooked-in | >3 months | 5.48 | 4.7 | 85.8 |

By "Post-added" we mean blending of a certain amount of biopolymer latex binder with previously cooked urea-formaldehyde polymer resin; by "Cooked-in" we mean addition of the biopolymer latex binder during the polymerization of urea and formaldehyde.

In Example 5 (for both samples J and K), where the synthetic polystyrene acrylic acid was 100% replaced on a one-for-one basis, the urea-formaldehyde in the composition provides the multifunctional crosslinker for the biopolymer latex binder. The relative performance is illustrated by comparing the control sample H to sample J (post-added) and K (cooked-in). Sample K provides sufficient tensile strength and Retention to serve as a suitable binder system for non-woven fiber mats used in roofing shingles. The significant advantage is that this binder composition has much improved stability and much longer shelf life, whereas the conventional UF-poly(styrene-co-methacrylic acid) binder system requires to be pre-mixed right before application. This poor shelf life stability causes waste and requires added manpower and cost for ongoing and frequent batch preparations.

Example 6

Replacement of SB Latex in Roofing Shingle Binder

Fiberglass asphalt shingles are made of a dense fiberglass mat bonded with urea-formaldehyde resin and then coated with asphalt. SB latex has been added to the urea formaldehyde resins, for example to increase the flexibility of the shingle. A comparative binder was made of a UF resin with 5 wt % SB latex on a dry solids basis. Experimental samples were made with a) a mixture of UF resin and 5 wt % on a dry solids basis of EcoSphere® 2202 crosslinked starch nanoparticles, b) a mixture of 5 wt % on a dry solids basis of SB latex and Ecosphere 2202 particles at a 1:3 ratio and c) 5 wt % on a dry solids basis of EcoSphere® 2202 particles "Cooked-in", meaning added during the polymerization of urea and formaldehyde. Test strips were made and tested for tensile strength as described in Example 5. The dry and wet tensile strength results are presented in Table 3. As shown in Table 3, the tensile strengths of all of the samples tested were adequate for use in fiberglass shingles. The SB latex mixture had a short shelf life whereas the EcoSphere® 2202 mixtures can be expected based on the results in Example 5 to have a significantly longer shelf life.

TABLE 3

Tensile Testing of Treated Nonwovens

| Sample | Max Load Dry (kgF) | Max Load Wet (kgF) | Retention % |
|---|---|---|---|
| UF with 5% of SB | 33.3 | 28.0 | 84.1 |
| UF with 5% of EcoSphere ® 2202 | 25.8 | 24.2 | 94.1 |
| UF with SB/Eco 1:3 | 32.9 | 28.1 | 85.5 |
| UF with 5% of EcoSphere ® 2202 cooked in | 34.3 | 28.0 | 81.7 |

Example 7

Binders with Varying Amounts of Crosslinker

Sample binder compositions were prepared as described in Example 1 but with different amounts of the TEOS crosslinker. In particular, compositions having 0, 0.5, 1.0, 3.0 and 5.0 wt % TEOS based on dry solids were prepared. The binder compositions were tested for wet and dry tensile strength using the method described in Example 3 except that a 1 kN load cell was used in the Instron tensile tester instead of the 5 kN load cell used in Example 3. The 1 kN load cell is believed to provided more accurate results. The tensile strength results are presented in Table 4. All of the amounts of crosslinker tested showed improvements in dry and wet strength over the composition without crosslinker.

TABLE 4

Tensile Strength of Binders with Different Amounts of Crosslinker

| Wt % TEOS crosslinker | Dry strength (max load in KgF) | Wet strength (max load in KgF) | Retention (%) |
|---|---|---|---|
| 0.0 | 50.1 | 7.5 | 14.9 |
| 0.5 | 62.9 | 28.8 | 45.7 |
| 1.0 | 66.1 | 30.6 | 46.3 |
| 3.0 | 61.3 | 22.3 | 36.3 |
| 5.0 | 57.4 | 22.9 | 40.0 |

Example 8

Binders with Different Crosslinkers

Sample binder compositions were prepared as described in Example 1 but with different crosslinkers. In particular, compositions having 1 wt % TEOS, 3 wt % calcium metasilicate, 1 wt % calcium metasilicate and 1 wt % sodium metasilicate based on dry solids were prepared. The binder compositions were tested for wet and dry tensile strength using the method described in Example 3 except that a 1 kN load cell was used in the Instron tensile tester instead of the 5 kN load cell used in Example 3. The 1 kN load cell is believed to provided more accurate results. The tensile strength results are presented in Table 5. Variations in tensile strengths between examples are believed to be due to variations in the density of the fiber mat sheets and the load cells. Results are believed to be comparable within an example, but not necessarily between examples.

TABLE 5

Tensile Strength of Binders with Different Crosslinkers

| Crosslinker | Dry strength (max load in KgF) | Wet strength (max load in KgF) | Retention (%) |
|---|---|---|---|
| 1 wt % TEOS | 64.9 | 50.9 | 78.3 |
| 3 wt % Ca metasilicate | 61.4 | 47.6 | 77.4 |
| 1 wt % Ca metasilicate | 61.3 | 37.6 | 61.3 |
| 1 wt % Na metasilicate | 65.3 | 37.3 | 57.1 |

Thus, the invention provides a curable composition for forming a composite material wherein the composition includes a biopolymer nanoparticle latex including crosslinked nanoparticles, and a multifunctional crosslinking agent for forming a cured crosslinked binder joining a portion of a plurality of reinforcement fibers in the composite material.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for forming a composite material, the method comprising the steps of:
    (a) providing a reinforcement material selected from the group consisting wood chips, sawmill shavings, saw dust, wood veneers, wood strips, and mixtures thereof;
    (b) applying a curable binder to at least some of the reinforcement material, wherein the curable binder comprises (i) a latex including internally crosslinked biopolymer nanoparticles in water, and (ii) a crosslinking agent in solution with the water; and
    (c) curing the curable binder to form a cured binder joining at least a portion of the reinforcement material.

2. The method of claim 1 wherein:
step (c) comprises heating the curable binder and reinforcement material at a temperature of 130° C. to 230° C. for sufficient time to cure the curable binder.

3. The method of claim 1 wherein:
the crosslinking agent in solution with the water is a formaldehyde based resin.

4. The method of claim 1 wherein:
the crosslinking agent in solution with the water is a substantially water-dilutable or dispersible adduct of co-condensation of urea and formaldehyde.

5. The method of claim 1 wherein:
the biopolymer nanoparticles have an average particle size ranging from 1 to 1000 nanometers.

6. The method of claim 1 wherein:
the biopolymer nanoparticles are present in the curable binder at a concentration of between 4% and 50% by weight of the curable binder.

7. The method of claim 6 wherein:
the biopolymer nanoparticles are present in the curable binder at a concentration of between 10% and 20% by weight of the curable binder.

8. The method of claim 1 wherein:
the crosslinking agent in solution with the water is present in the curable binder at a concentration of between 0.1% and 10% by weight of the curable binder.

9. The method of claim 1 wherein the curable binder is substantially formaldehyde free.

10. The method of claim 1 wherein the crosslinking agent is glyoxal.

11. The method of claim 1 wherein the crosslinking agent is tetraethyl orthosilicate.

* * * * *